United States Patent [19]

Kukkohovi

[11] Patent Number: 6,119,003
[45] Date of Patent: Sep. 12, 2000

[54] METHODS AND APPARATUS FOR PERFORMING AUTOMATIC MODE SELECTION IN A MULTIMODE MOBILE TERMINAL

[75] Inventor: Marko Kukkohovi, Oulu, Finland

[73] Assignee: Nokia Mobile Phones Limited, Salo, Finland

[21] Appl. No.: 08/921,685

[22] Filed: Sep. 2, 1997

Related U.S. Application Data

[60] Provisional application No. 60/025,682, Sep. 9, 1996.

[51] Int. Cl.[7] ................................................ H04Q 7/20
[52] U.S. Cl. ........................ 455/435; 455/432; 455/434
[58] Field of Search ................................ 455/434, 435, 455/458, 445, 62, 422, 426, 432, 552, 553

[56] References Cited

U.S. PATENT DOCUMENTS

| | | | |
|---|---|---|---|
| 4,556,750 | 12/1985 | Goldman | 179/2 EB |
| 5,020,093 | 5/1991 | Pireh | 379/59 |
| 5,027,428 | 6/1991 | Ishiguro et al. | 455/67 |
| 5,355,517 | 10/1994 | Olson | 455/510 |
| 5,442,806 | 8/1995 | Barber et al. | 455/435 |
| 5,463,674 | 10/1995 | Gillig et al. | 379/59 |
| 5,504,803 | 4/1996 | Yamada et al. | 455/434 |
| 5,524,278 | 6/1996 | Williams et al. | 455/33.4 |
| 5,711,001 | 1/1998 | Bussan et al. | 455/434 |
| 5,826,191 | 10/1998 | Krishnan | 455/432 |
| 5,862,480 | 1/1999 | Wild et al. | 455/432 |
| 5,862,490 | 1/1999 | Sasuta et al. | 455/525 |
| 5,903,832 | 5/1999 | Seppanen et al. | 455/414 |
| 5,933,785 | 8/1999 | Tayloe | 455/558 |
| 5,983,092 | 11/1999 | Whinnett et al. | 455/406 |

*Primary Examiner*—Nguyen Vo
*Assistant Examiner*—Duc Nguyen
*Attorney, Agent, or Firm*—Ohlandt, Greeley, Ruggiero, & Perle, LLP

[57] ABSTRACT

A wireless user terminal (10), such as a multimode cellular telephone, includes at least three master control systems, specifically a primary system controller, a secondary system controller, and a multimode controller. The multimode controller is capable of bidirectionally exchanging control messages and status messages with the primary and secondary system controllers for automatically switching the state of the terminal bidirectionally between the primary and secondary systems.

14 Claims, 6 Drawing Sheets

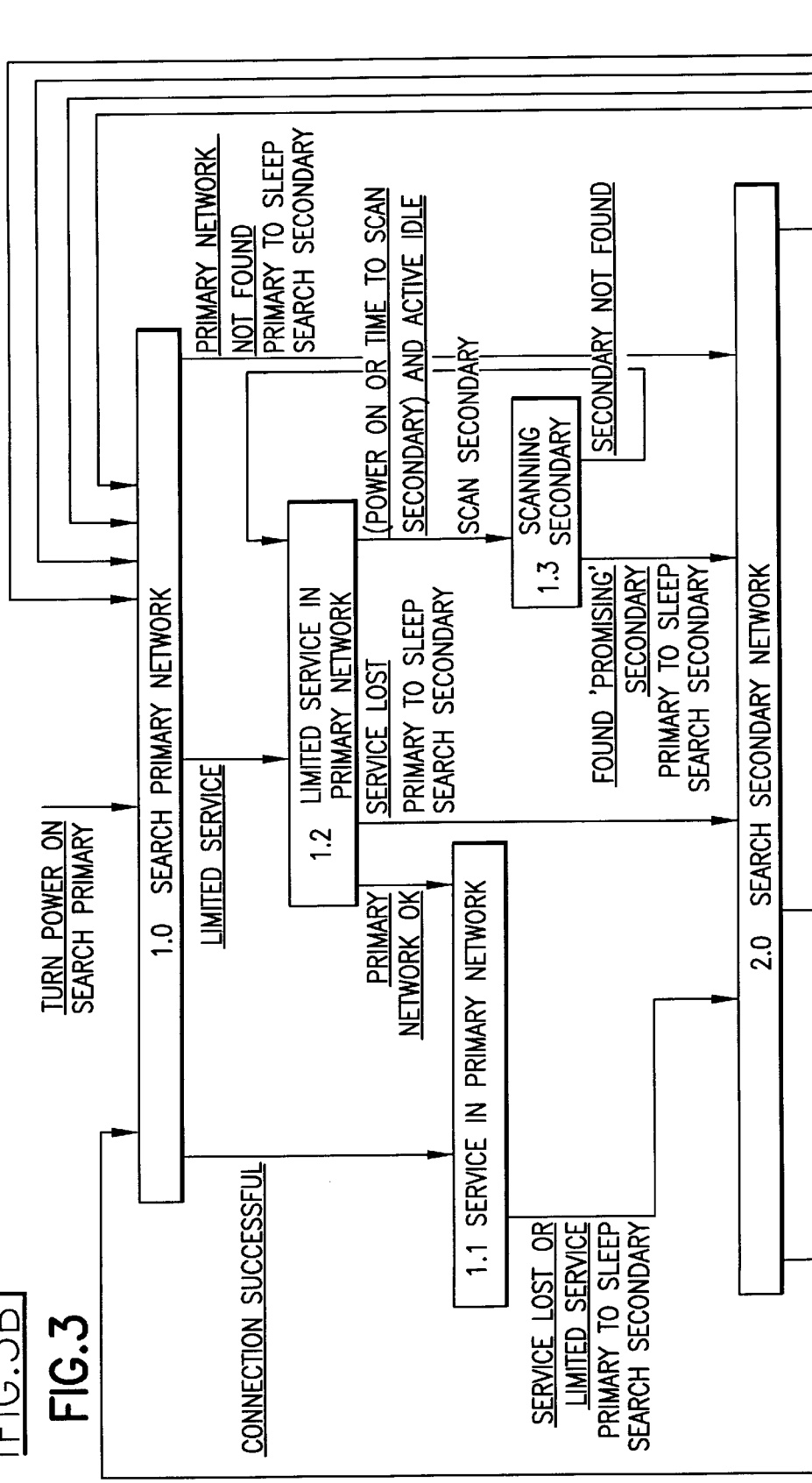

METHODS AND APPARATUS FOR PERFORMING AUTOMATIC MODE SELECTION IN A MULTIMODE MOBILE TERMINAL

CLAIM OF PRIORITY FROM A COPENDING PROVISIONAL PATENT APPLICATION

Priority is herewith claimed under 35 U.S.C. §119(e) from copending Provisional Patent Application Ser. No. 60/025,682, filed Sep. 9, 1996, entitled "Methods and Apparatus for Performing Automatic Mode Selection in a Multimode Terminal", by Marko Kukkohovi. The disclosure of this Provisional Patent Application is incorporated by reference herein in its entirety.

FIELD OF THE INVENTION

This invention relates generally to radiotelephones and, in particular, to radiotelephones or mobile terminals such as those capable of operation with a cellular network.

BACKGROUND OF THE INVENTION

A multimode mobile terminal, such as a radiotelephone or personal communicator, is capable of operating in more than one system. By example, and for a dual mode mobile terminal, the modes may be a digital cellular mode (e.g., GSM or DCS1900) and an analog cellular mode (e.g., IS-41 (AMPS)).

As can be appreciated, it is important that a multimode mobile terminal be capable of automatically switching between the available operating modes when conditions warrant.

Some types of known networks do provide for inter-network roaming (e.g., DAMPS/AMPS). Reference can be had to a publication entitled "Implementation Guide: Non-Public Mode Operation and Selection in IS-136 Compliant Mobile Stations", Version 2.0, TDMA Forum, Mar. 9, 1995.

It can thus be appreciated that the capability to switch between networks becomes especially important when the terminal operates with networks that do not support inter-network roaming (e.g., DCS1900 and AMPS).

One technique has been proposed in a publication entitled "Inter-Network Roaming Selection", North American Interest Group (NAIG) of the GSM MoU, Jun. 21, 1996 (Ericsson). This publication describes a limited PCS1900/AMPS solution using a systems priority list, wherein a handset moves from the digital network (PCS1900) to the analog network (AMPS). However, this proposal does not provide full, bidirectional mode selection, in that no provision is made to automatically move from the analog network back to the digital network.

Also of interest in this area are U.S. Pat. No. 5,504,803, entitled "Method for Automatic Mode Selection for a Dual-Mode Telephone Handset for use in a Cellular Mobile Telephone System and in a Wireless Telephone System", by Yamada et al., and U.S. Pat. No. 4,916,728, entitled "Cellular Telephone Unit with Prioritized Frequency Acquisition", by Blair.

OBJECTS OF THE INVENTION

It is thus a first object of this invention to provide an improved method for performing automatic mode selection with a multimode user terminal when operating with networks that do not support inter-network roaming.

It is a further object of this invention to provide a multimode user terminal that includes at least three master control systems, specifically a primary system controller, a secondary system controller, and a multimode controller, wherein the multimode controller is capable of bidirectionally exchanging control messages and status messages with the primary and secondary system controllers for freely switching the state of the terminal between the primary and secondary systems, wherein the primary and secondary systems do not support inter-network roaming.

SUMMARY OF THE INVENTION

This invention provides methods to implement an automatic mode selection in a multimode terminal using properties already found in existing networks, the multimode terminal being a device capable of connecting to different networks of different systems of a type that do not support inter-network roaming. If the current network coverage is not adequate to provide reliable communications, e.g., the signal is too weak or missing, the terminal is enabled to access another network in another system without user intervention. The automatic mode selection may be canceled through the user interface of the terminal, and no automatic mode selection is then performed.

The networks can be arranged in an ordered or prioritized list that is stored in the terminal. The list can be provided by a specific system operator, or can be provided by the user through the user interface. Since the mode selection is based on the stored priority list, the best possible selectable network is typically always active. The terminal periodically checks or scans for the presence of any networks which are listed earlier in the ordered list than the current network. That is, the terminal automatically scans for the presence of higher priority networks. If such a network is detected, the terminal automatically changes the mode and connects to the preferred and available network.

When the method is implemented in a multimode terminal, the terminal can change modes transparently to a user. The selectable modes can be arranged in an ordered list and the terminal then chooses the best mode available based on this list. So when a mode change is needed the networks are checked in the order of the list.

From the user's point of view, the terminal is in a preferred mode, if possible, and if not possible, then the mode is selected based on the list arranged by the user or prearranged by the operator.

Although described primarily in the context of a dual mode terminal, the teachings of this invention can be readily extended to three mode and higher terminals.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
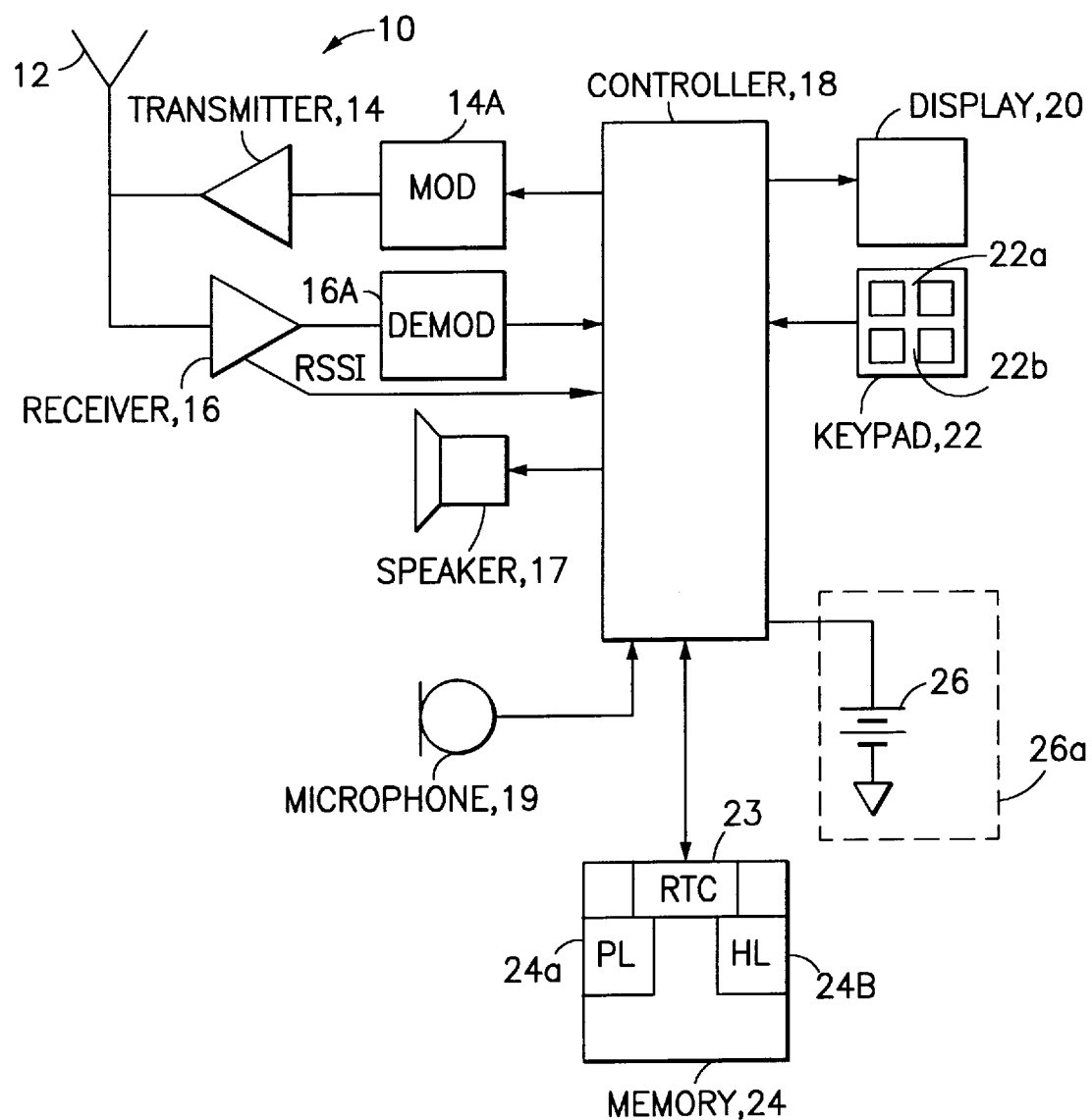
FIG. 1 is a block diagram of a mobile terminal that is constructed and operated in accordance with this invention.
Figure 2:
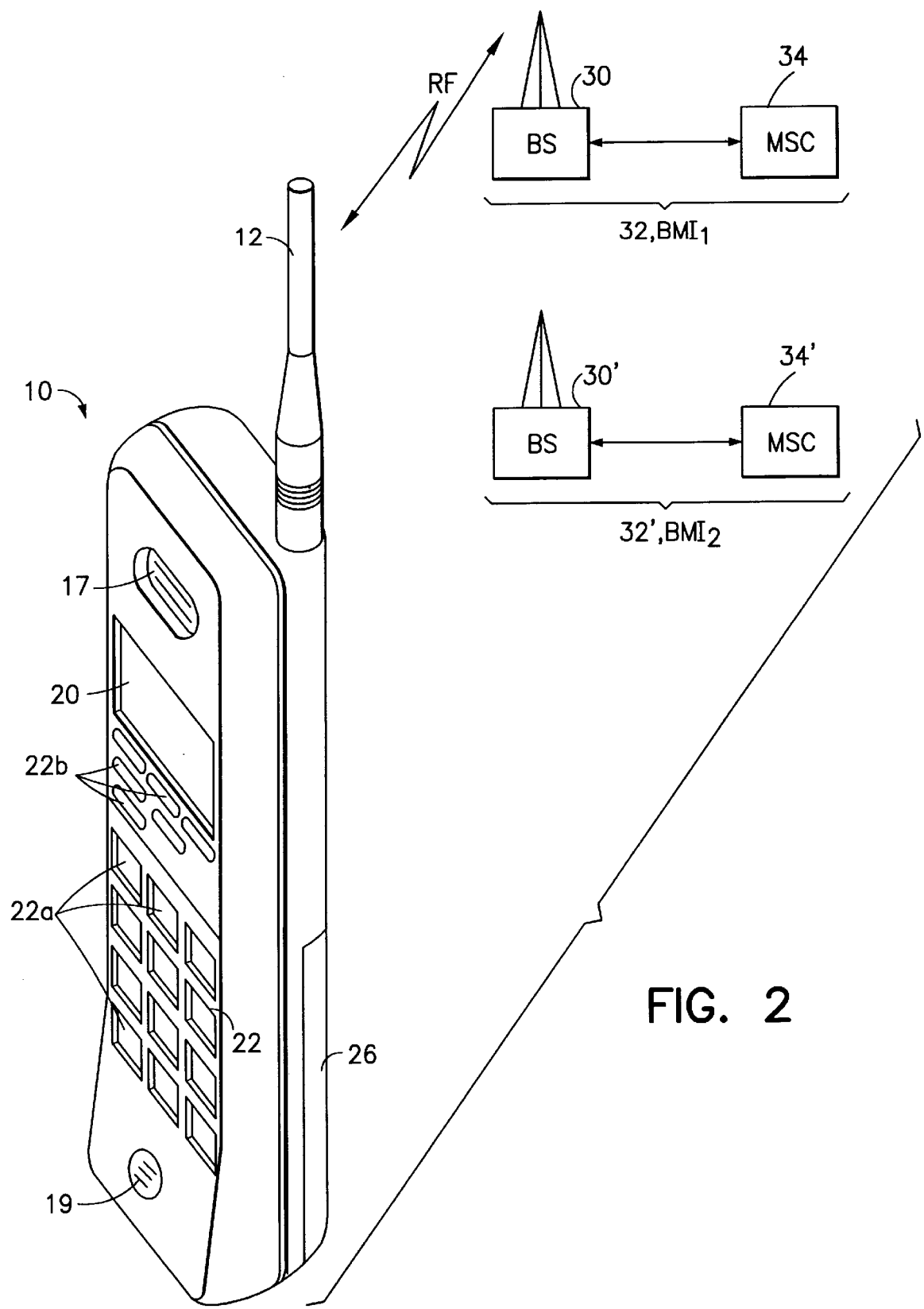
FIG. 2 is an elevational view of the mobile terminal shown in FIG. 1, and which further illustrates a cellular communication system to which the mobile terminal is bidirectionally coupled through wireless RF links.

Reference is made to FIGS. 1 and 2 for illustrating a wireless user terminal or mobile terminal 10, such as but not limited to a cellular radiotelephone or a personal communicator, that is suitable for practicing this invention. The mobile terminal 10 includes an antenna 12 for transmitting signals to and for receiving signals from a first base site or base station 30. The base station 30 is a part of a first cellular network comprising a Base Station/Mobile Switching Center/Internetworking function ($BMI_1$) 32 that includes a mobile switching center (MSC) 34. The MSC 34 provides a connection to landline trunks when the mobile terminal 10 is involved in a call.

FIG. 2 also shows a second $BMI_2$ 32', having associated base station(s) 30' and MSC 32'. By example, the $BMI_1$ 32 may be a digital system (e.g., DCS1900 or GSM), and the $BMI_2$ 32' may be an analog system (e.g., IS-41) or another digital system. One of the systems is considered the preferred or primary system (typically the digital system), while the other system is considered the secondary system. The mobile terminal 10 will attempt to use the primary system when possible. This invention provides a mechanism for the mobile terminal 10 to switch between the primary and secondary systems in an automatic and user-transparent manner. It is assumed that the two systems do not support inter-network roaming.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

It is understood that the controller 18 also includes the circuitry required for implementing the audio and logic functions of the mobile terminal. By example, the controller 18 may be comprised of a digital signal processor device, a microprocessor device, and various analog to digital converters, digital to analog converters, and other support circuits. The control and signal processing functions of the mobile terminal are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile terminal 10. These other keys 22b may include, by example, a SEND key, various menu scrolling and soft keys, and a PWR key. The mobile terminal 10 also includes a battery 26 contained in a battery pack 26A for powering the various circuits that are required to operate the mobile terminal.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. For the purposes of this invention the memory 24 is assumed to store a system or network ordered priority list (PL) 24A, and may store also a network history list (HL) 24B, as described below. Furthermore, in some embodiments of this invention a portion of the memory may be employed to maintain a real time clock (RTC) 23, such as by incrementing memory locations periodically. Alternatively, a well-known type of RTC device can be included within the terminal 10, which can be read as desired by the controller 18.

For the purposes of this invention the transmitter 14, receiver 16, modulator 14A and demodulator 16A may be dual-mode capable, and may operate with the frequencies, modulation types, access types, etc. of the primary and secondary systems. Alternatively, dual mode operation can be achieved by duplicating these components for each system of interest, and by also providing certain components that are capable of operating in both systems.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating with any of a number of other standards such as GSM and IS-95 (CDMA). The teaching of this invention is particularly useful in those types of systems that do not provide inter-network roaming.

It should thus be clear that the teaching of this invention is not to be construed to be limited to any one particular type of mobile terminal or air interface standard, and is furthermore not limited only to dual mode operation, as tri-mode and higher terminals can also benefit from the use of this invention.

The operating program in the memory 24 includes routines to present messages and message-related functions to the user on the display 20, typically as various menu items. The memory 24 also includes routines for implementing the method described below in relation to FIGS. 3–5.

In general, the automatic mode selection operation requires the multimode terminal 10 to be capable of scanning the networks, scanning here meaning scanning of a network while being connected to another network. If the terminal 10 is using its preferred or primary network (the first one in the ordered list 24A), then it stays connected to the primary network until the network is no longer available (connection lost, coverage too weak etc.), and/or until some other criterion is met or other criteria are met, as will be described below. The terminal 10 then begins scanning for the second network (i.e., the secondary network) in the ordered priority list 24A. If the secondary network is found a connection is then made to the secondary network, and the current connection to the highest priority network is disconnected. If the connection to the secondary network fails, or if no secondary network is found, the terminal 10 attempts to locate a third network in the ordered list 24A (if present in the ordered list).

This process continues until the end of the list is reached.

If no network is available, the terminal 10 enters a power save state for a certain period of time, after which it again begins scanning for networks, starting with the first network (i.e., the primary network) in the ordered list 24A.

Assuming now that the terminal 10 makes a successful connection to the secondary network, since this is not the preferred mode of operation, the first network in the ordered list is periodically scanned. If it is found and is available, the current network connection is cancelled (disconnected) and an attempt to connect to the preferred network is made so long as an active call is not in progress. If an active call is in progress, the connection to the other network can be made automatically after the termination of the call.

If the secondary network is not found, and a successful connection to a tertiary network is made, the periodic scanning is first performed for the primary network, and if not found then the secondary network is scanned. If the secondary network is not found or is not available, the terminal 10 remains connected to the tertiary network. If the primary network is not found or is not available, but the secondary network is found, a connection to the secondary network is made and the current tertiary network is disconnected.

This invention thus pertains to the network selection procedure, which is triggered by (a) a loss of service in the current network or (b) if the scanning of a preferred network produces an output that indicates that the preferred network is available.

The network selection criteria can also be based on, by example, the use of cell broadcast messages, wherein the network sends information concerning call rates. In this case the terminal 10 may receive broadcasts from different networks and then selects the lowest cost network that is currently available. In this embodiment the network sends call rates and the time of day when the rates are valid. With the use of a real time clock within the terminal 10, the terminal can automatically switch networks so as to always avail itself of the lowest rates for incoming and/or outgoing calls.

Further with regard to cell broadcast messages, a given system operator may have two different networks in a certain area. Because of congestion in one network the system operator may send a message to instruct all or some dual mode terminals in that area to use the less congested network. The operator may include a timer in the message, the timer being used to keep the terminal in the less congested network until the timer elapses. Only at that time does the terminal 10 begin scanning for the other network. In this manner the operator may more evenly distribute the usage of the networks in a given area.

The network selection criteria can also be based on, by example, a received signal strength indicator RSSI (or C1 in GSM systems). Normally C1 (RSSI) is used to select a suitable cell within a network. However, it can also be used to select a more suitable network to which the terminal is allowed to connect. This reduces the current consumption in the terminal, since a lower transmitter power would be used (it being assumed that the network having the highest RSSI would require less terminal transmission power).

The network selection criteria can also be based on, by example, the above-mentioned real time clock 23. Normally system operators have different call rates at different times of the day. In order to facilitate the use of time information, the user can employ the user interface to program the terminal to change networks at particular times.

It is also within the scope of the teaching of this invention to base the network selection criteria on a prediction of when the terminal 10 is about to lose the connection. By example, if it is observed that the RSSI is gradually decreasing over time, and/or that the bit error rate (BER) or word error rate (WER) is gradually increasing, a prediction may be made that the terminal 10 is losing the connection with the current primary network. In the case where RSSI and BER and/or WER are used the criteria can be considered to be related (i.e., signal strength and signal quality). Also in this case the terminal 10 may "prestart" the module for the other secondary network, command the module to perform network scanning (without transmitting), make a proper detach from the primary network, and finally make a new connection to the secondary network. In this case the mode switching can be achieved in a rapid fashion.

In other cases the mode switching criteria may be unrelated, such as RSSI and time of day, or BER and network rate structure.

Figure 3B:
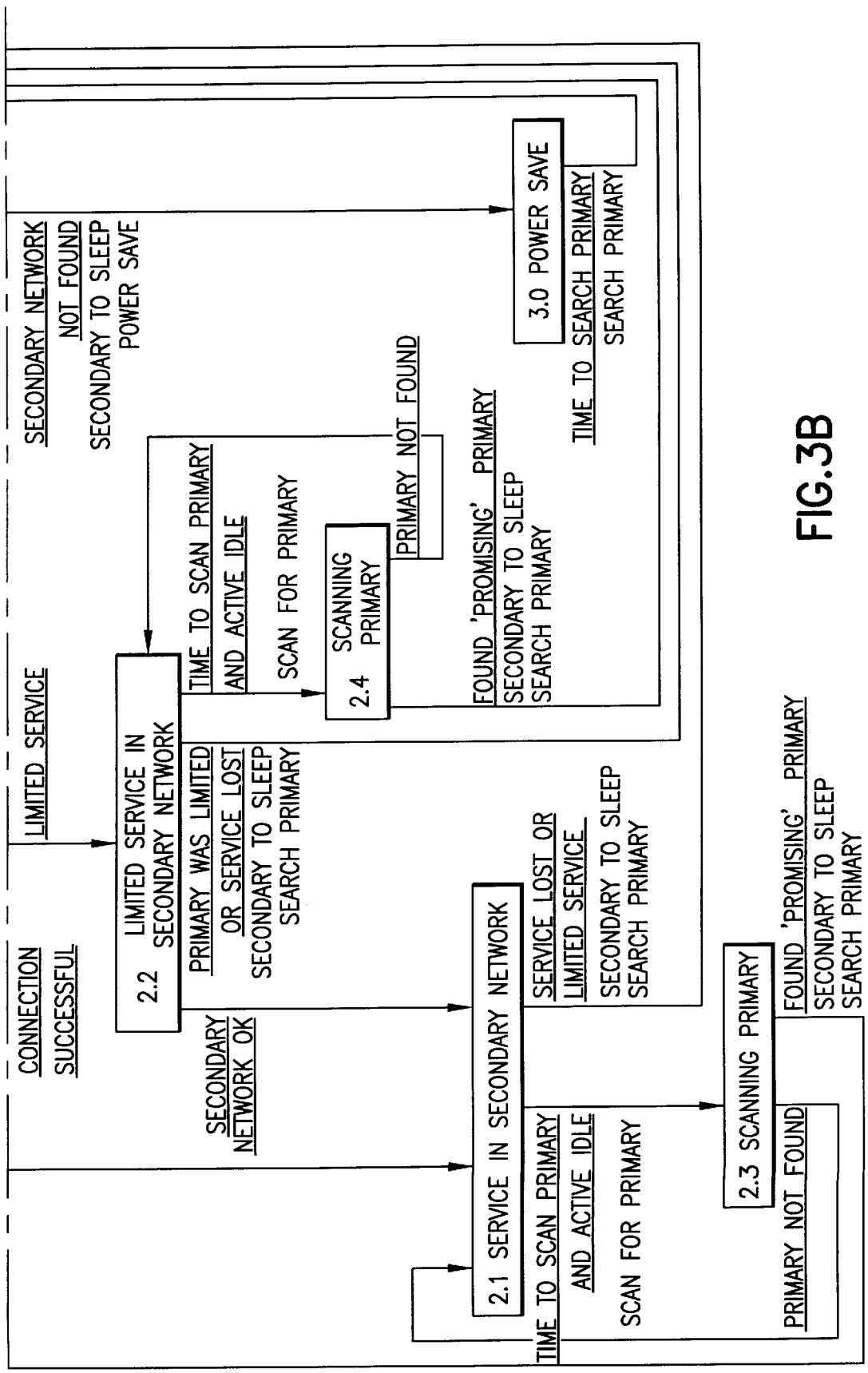
FIG. 3 is a logic flow diagram illustrating one embodiment of a method for performing automatic mode selection in a multimode terminal.

Reference is now made to FIG. 3 for illustrating an embodiment of a method of this invention. The terminal 10 enters Block 1.0 at initial power on or from Blocks 2.1, 2.2, 2.3, 2.4, or 3.0, as described below. Block 1.0 is a Search for Primary System or Network Block wherein the terminal 10 scans its receiver 16 in order to locate a transmission from the first network listed in the ordered list 24A. Assuming now that the search for the primary network is successful, that is, that the primary network is located and that the terminal 10 has successfully registered in the primary network for all available services for the terminal's subscription, the terminal enters Block 1.1 "Service in Primary Network". The terminal 10 stays in Block 1.1 until service is lost (or is predicted to be lost) or until, for some reason, the terminal 10 is switched from a full service to a limited service state. A number of other criteria may also be employed, as described previously and as will be described in further detail below. In any event, the terminal 10 places the primary mode module (e.g., the digital TDMA module) into a low power state (see, for example, FIGS. 4 and 5) and enters Block 2.0 (Search For Secondary Network).

Before proceeding further with this description, reference is again made to Block 1.0. For the case where the terminal 10 is unable to successfully register in a "full service" mode, the terminal 10 may be registered instead for limited service. For example, GSM defines a limited service mode wherein a terminal can make emergency calls, but cannot otherwise make or receive calls. This condition may be only temporary due to, for example, system loading considerations or component malfunctions. As such, after some period of time in the limited service mode of Block 1.2 the terminal 10 may be granted full service. At this time the terminal 10 enters Block 1.1, and remains there until service is lost, limited service is reinstated, or some other criteria are fulfilled.

While in the limited service mode (Block 1.2) the terminal 10 periodically puts the primary mode module into the low power state and enters Block 2.0 to search for a secondary network. That is, operation in the secondary network may be preferred to only limited service in the primary network.

Returning again to Block 1.0 if the search for the primary network is unsuccessful, either because the network could not be located or because the terminal could not register for either full service or limited service, the primary mode module is put into a low power state and Block 2.0 is entered to search for the secondary network.

It is noted that putting the primary mode module into a low power state ("to sleep") typically entails powering down or off the circuits required to receive and demodulate the digital transmission, while powering up or activating the circuitry required to receive and demodulate the analog (e.g., AMPS) network. In other embodiments this could entail powering down the TDMA-related circuitry while activating CDMA-circuitry, assuming that a TDMA system is the primary system and a CDMA system is the secondary system.

Referring now to Block 2.0, and assuming that the terminal 10 has successfully located and registered into the secondary network, the method enters Block 2.1 (Service In Secondary Network). This block differs from the previously described Block 1.1 in that there are at least two ways to exit Block 2.1. A first method is if service is lost in the secondary network, or if the secondary network is placed in the limited service mode. In this case, the secondary mode module is placed in the low power state and control passes back to Block 1.0 to search for the primary network. A second exit results from the expiration of a timer which indicates that it is time to automatically scan for the primary network. A second condition, in addition to the timer expiring, is that the terminal 10 be in an active idle state wherein the terminal 10 is not actively involved in a call. In this case the terminal operation periodically enters Block 2.3 to scan for the primary network. If the primary network is not found control passes back to Block 2.1 to remain in the secondary network. However, if a "promising" primary network is located, the secondary mode module is placed in a low power mode and control returns to Block 1.0. A "promising" primary network, for the purposes of this invention, is a network that is not forbidden for the mobile terminal 10 to access.

It should be noted that the terminal is capable of receiving calls from the secondary system while scanning for the primary in Block 2.1. If while scanning for the primary network some activity occurs in the secondary network, such as the receipt of a call, the scanning is terminated and the results ignored. Control then passes back to Block 2.1.

In this regard the terminal 10 may generate the history list (HL) 24B that is stored in the memory 24. The history list 24B can be used to indicate those networks that are found to be forbidden or otherwise not accessible by the terminal 10. The history list 24B can thus be used to prevent the unnecessary scanning for and attempted registration into forbidden networks. The history list can be periodically updated and/or erased, as a given network may be only temporarily forbidden to the terminal 10.

Returning now to Block 2.0, if the terminal 10 is instead granted limited service in the secondary network, control passes to Block 2.2. The terminal remains in Block 2.2 until granted full service, at which time control passes to Block 2.1, or until a periodic rescanning of the primary network is performed at Block 2.4. If the primary network is not found, control passes back to the limited service mode of Block 2.2. If a promising primary network is found, the secondary network is put to sleep, and control passes back to Block 1.0. The terminal 10 may reside in the limited service secondary network (Block 2.2) if this is the only service available.

Returning again to Block 2.0, if the secondary network is not found control passes instead to Block 3.0 where the terminal 10 enters a low power state for some predetermined period of time. In a preferred embodiment of this invention the period of time is variable, such as 5 seconds, 10 seconds, 20 seconds, . . . , 2 minutes, etc. That is, the power save period gradually increases with time (to some maximum value) if neither the primary or secondary networks are found. At the expiration of the power save time period control passes back to Block 1.0 in order to once more search for the primary network.

Block 2.0 can be entered from Block 1.2 and also from Block 1.3 (limited primary service and power_on or time to scan secondary during active idle). At Block 1.3, and if the secondary network is not found, control passes back to Block 1.2 to provide the terminal 10 with at least limited service in the primary network. If a promising secondary network is found in Block 1.3, control passes to Block 2.0.

Figure 4:
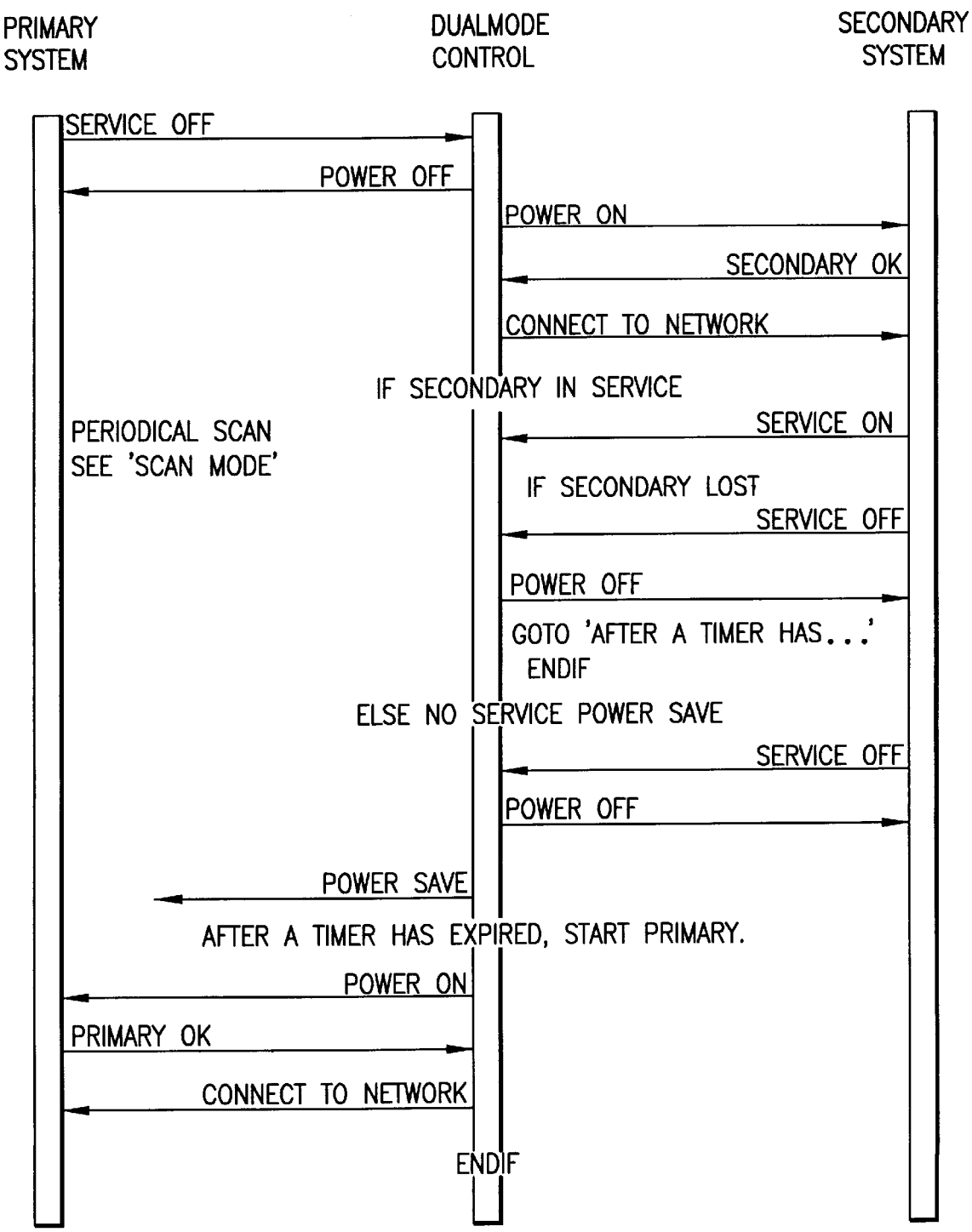
FIG. 4 illustrates the flow of signalling messages between a dual-mode controller and primary and secondary system controllers for a case where primary service is terminated.
Figure 5:
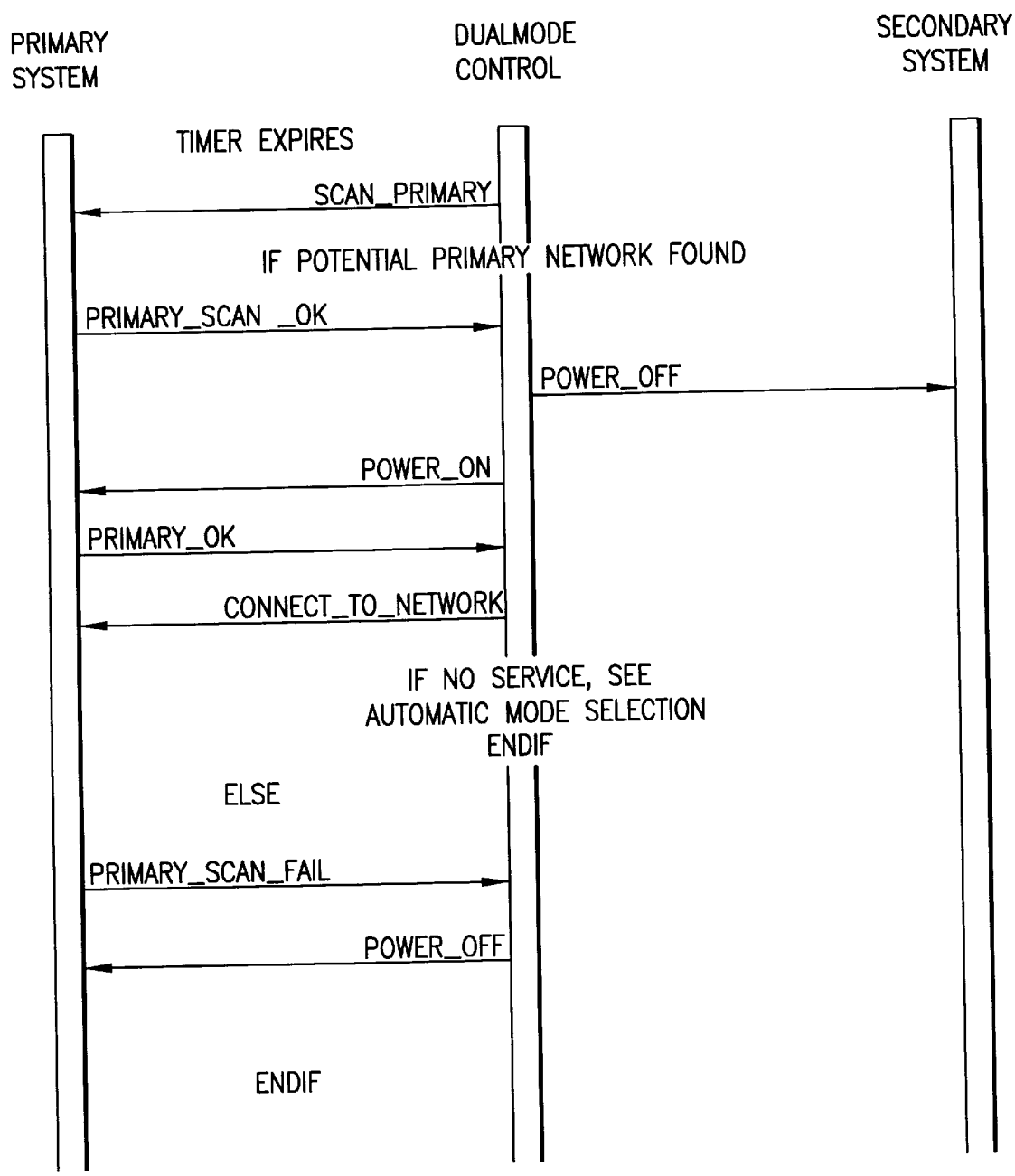
FIG. 5 illustrates in greater detail the flow of signalling messages for executing a primary scan mode when operating in the secondary system.

Reference is now made to FIGS. 4 and 5. These figures illustrate the interactions between the three main control systems for a dual mode terminal. A first control system is for the primary system (e.g. a DCS1900 digital system), a second control system is for the secondary system (e.g. an IS-41 analog system), and a third control system is referred to as a dual mode control which mediates and controls the switching between the primary and secondary systems.

FIG. 4 shows that when the terminal 10 is connected to the secondary network, it scans the primary network periodically. The connection to the primary network is made when the scanning is successful and the secondary network is not active (call in progress, etc.). It should be noted that, for simplicity, the scenario presented in FIG. 4 does not include messages indicating the systems entering the limited service state. The limited service states and the conditions and actions associated with these states can be found in FIG. 3, as discussed above.

FIG. 5 illustrates the case where the secondary system is in service, and the periodic scanning for the primary system. If during the scanning (between and including "Timer Expires" and "primary scan ok/fail") a call is received in the secondary system, not shown in this flow chart, the scanning may be stopped with a scan stop message.

The invention has been primarily described in the context of mode switching that occurs upon a loss of signal that results in the existing connection being lost or in danger of being lost. However, it should be realized that one or more other criteria can be used in making the mode switching decision. By example, assume that the terminal 10 is operating in the secondary system (Block 2.1), and the user desires to send or receive a facsimile or to send or receive a short message service (SMS) transmission. In this case the existing secondary network, although possibly having adequate signal strength, can be considered to have a limited functionality. That is, the secondary network does not support the user's current communications needs. In this case, the method exits Block 2.1, as though the service were lost, and reenters Block 1.0 to search for the primary network. In this case, it is further assumed that the primary network does support the user's current communication needs.

Other suitable criteria can be based on differences in calling rates between the primary and secondary systems. By example, during a certain time of day it may be less expensive to operate in the secondary network than in the primary network. The terminal 10 is assumed to maintain the real time clock 23 or to otherwise have access to a current time of day (the BMI 32 may periodically broadcast the time of day). In any event, at a predetermined time that is either programmed by the user or received from the network, the terminal 10 can exist Block 1.1 as though the service were lost and enter Block 2.0 to search for the secondary network. The terminal 10 can then reside in Block 2.1 until the expiration of a timer or until the real time clock 23 indicates that the rates have dropped in the primary system. At this time the mobile terminal 10 exits Block 2.1 as though the service were lost and reenters Block 1.0 to reestablish service in the primary network.

As such, it should be realized that the transition from primary to secondary and secondary to primary systems can be based on one or more related or unrelated criteria (e.g. signal strength and/or time of day).

It should further be realized that it is within the scope of this invention to identify a plurality of primary networks based on functionality. By example, one primary network may be preferred for its long distance calling rates, while another primary network may be preferred for its data transmission capability. As such, Blocks 1.0 and 1.1 can be modified so as to recursively search for a first preferred primary network (for example when the user intends to make a long distance telephone call). If service in the preferred primary network is not available, then Block 1.0 can be reentered so as to search for a second primary network (e.g. one that provides long distance service but at a less-favorable rate, or one that also provides data service but at a lower maximum transmission speed).

Although described in the context of preferred embodiments, it should be realized that a number of modifications to these teachings may occur to one skilled in the art. By example, the logic flow diagram of FIG. 3 can be modified to add or delete steps, while still performing the same functions. In a similar manner the message passing interaction depicted in FIGS. 4 and 5 can be modified to add or delete messages. Also, and as was previously mentioned, these embodiments can be modified so as to accommodate tertiary and higher networks in the priority list 23A.

It is further within the scope of this invention to provide a capability in the terminal's user interface to indicate to the user that the network reselection has been or is being performed. This feature may be further enabled or disabled by the user, through the use of a suitable programmed menu function.

Also, this invention provides a capability to provide a "manual" system handoff procedure. For example, assume that a user is involved in a call in a first network, and it becomes apparent that the connection to the current network will soon be or has been lost. In this case, the terminal 10 may automatically terminate the current call, if not already lost, rescan and locate a second suitable network, and then automatically call the same number (which is assumed to still be stored in the memory 24) and reestablish the call using the second network.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless user terminal of a type that is capable of communicating with a plurality of networks that do not support internetwork roaming, comprising the steps of:

scanning for a first network having a highest assigned priority;

registering in the first network if the first network is available for use;

if the highest priority network is not found, or becomes unavailable for use, automatically scanning for a second network having a second highest assigned priority;

registering in the second network if the second network is available for use;

automatically scanning for the first network while registered in the second network; and registering in the first network if the first network is available for use; wherein if the terminal is granted only limited service when registering into the first network, or is switched from a full service state to a limited service state, wherein the limited service is a subset of the full service that is available to the terminal from the first network, the method includes a further step of periodically scanning for the second network while still registered in the first network.

2. A method as set forth in claim 1, wherein the steps of automatically scanning are initiated by a loss of service in the network in which the terminal is registered.

3. A method as set forth in claim 1, wherein the steps of automatically scanning are initiated by a predicted loss of service in the network in which the terminal is registered.

4. A method as set forth in claim 1, wherein the steps of automatically scanning are initiated by a simultaneous presence of a plurality of predetermined criteria.

5. A method as set forth in claim 1, wherein the steps of automatically scanning are initiated by a simultaneous presence of a plurality of unrelated predetermined criteria.

6. A method as set forth in claim 1, wherein the steps of automatically scanning are initiated by a simultaneous presence of a plurality of related predetermined criteria.

7. A method as set forth in claim 1, wherein the step of automatically scanning for the first network while registered in the second network is performed periodically.

8. A method as set forth in claim 1, and further including a step of placing predetermined portions of the terminal into a low power mode of operation, the predetermined portions being those portions that are not required to communicate with the network to which the terminal is registered.

9. A multimode user terminal, comprising at least three master control systems, specifically a primary system controller, a secondary system controller, and a multimode controller, wherein the multimode controller is capable of bidirectionally exchanging control messages and status messages with the primary and secondary system controllers for automatically switching the state of the terminal bidirectionally between the primary and secondary systems, wherein the primary and secondary systems do not support inter-network roaming; and wherein if the terminal is granted only limited service when registering into the primary system, or is switched from a full service state to a limited service state, wherein the limited service is a subset of the full service that is available to the terminal from the first network, the method includes a further step of periodically scanning for the secondary system while still registered in the primary system.

10. A method for operating a wireless user terminal of a type that is capable of communicating with a plurality of networks that do not support inter-network roaming, comprising the steps of:

scanning for a first network having a first priority;

registering in the first network if the first network is available for use;

if the first network is not found, or becomes unavailable for use, automatically scanning for a second network having a second priority that is less than the first priority;

registering in the second network if the second network is available for use;

automatically scanning for the first network while registered in the second network; and registering in the first network if the first network is available for use; wherein in response to a condition wherein the terminal is granted only limited service by not being provided all available services in the first network that are consistent with the terminal's subscription, the method includes a further step of periodically scanning for the second network while still registered in the first network.

11. A method as in claim 10, wherein a network selection criterion considered by the terminal comprises information received from a broadcast channel.

12. A method as in claim 10, wherein a network selection criterion considered by the terminal comprises a time of day.

13. A method as in claim 10, wherein network selection criteria considered by the terminal comprise information received from a broadcast channel, in conjunction with a time of day.

14. A method as in claim 10, wherein if the second network is not available for use the method includes further steps of:

automatically scanning for a third network while registered in the first network;

registering in the third network if the third network is available for use;

automatically scanning for the first network while registered in the third network;

registering in the first network if the first network is available for use; otherwise automatically scanning for the second network while registered in the third network; and registering in the second network if the second network is available for use.

\* \* \* \* \*